Feb. 20, 1934.   G. W. FISSELL   1,947,839
BRAKE SHOES AND METHOD OF ATTACHING LINING TO THE SAME
Filed June 11, 1932
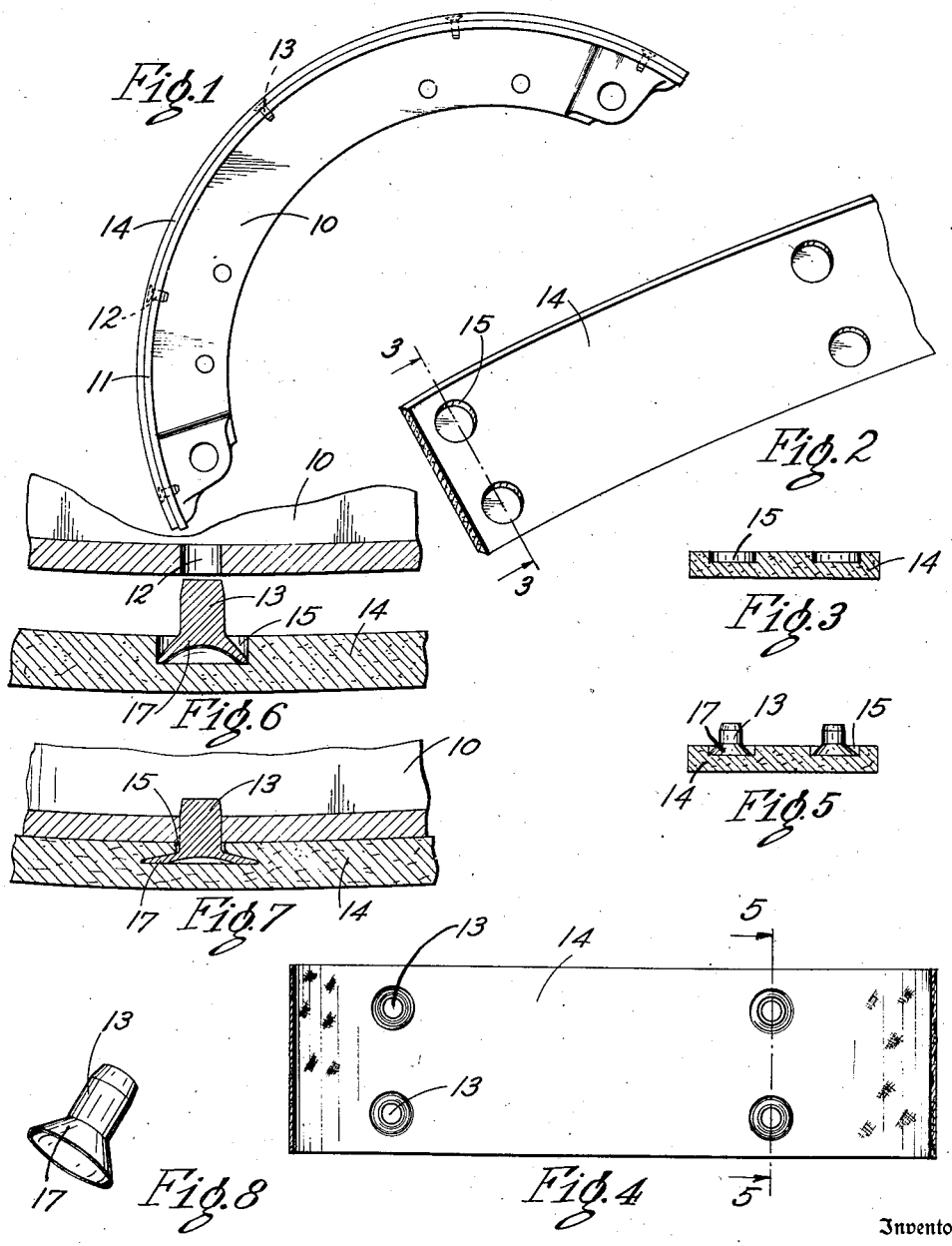
Inventor
GRANT W. FISSELL
By Richey & Watts
Attorneys Patented Feb. 20, 1934

1,947,839

UNITED STATES PATENT OFFICE

1,947,839

BRAKE SHOES AND METHOD OF ATTACHING LINING TO THE SAME

Grant W. Fissell, Cleveland, Ohio, assignor of one-half to Perry H. Stevens, Akron, Ohio Application June 11, 1932. Serial No. 616,683

8 Claims. (Cl. 29—152.1)

This invention relates to a method of securing two or more articles in intimate engagement as by riveting, and further pertains to an improved form of rivet adapted for use in conjunction with such method.

In the specific embodiment illustrated and described herein the invention contemplates the manner of attaching a strip of molded brake lining upon an automobile brake shoe and illustrates the structure of the preferred form of one embodiment of the improved rivet.

One of the objects of this invention is to provide a rivet which may be mounted in self sustaining engagement with one of the members of an assembly and which is adapted for ready application with a companion member while thus mounted.

Another object of the invention is to provide a medium of securely attaching brake lining material to a brake shoe, the head of the rivet employed therein being confined within the brake lining material so as to provide an uninterrupted surface upon the engaging face of the brake material.

Another object of the invention is to provide a rivet the head thereof being readily deformable under the application of the pressure necessary to affix the shank of the rivet upon the brake shoe during assembly.

Another object of the invention is to provide a method of attaching brake lining to a shoe or removing the same without demounting the brake shoe from the brake gear assembly.

Another object of the invention is to construct a rivet which is durable, economic of manufacture and which may be readily applied to the articles with which it is adapted to be employed, and interlocked therein simultaneous with the application therewith.

Other objects more or less ancillary to the foregoing and the manner in which all the various objects are realized will appear in the following description, which considered in connection with the accompanying drawing, sets forth the preferred embodiment of the invention.

In the drawing—

Figure 1 is an elevational view of an automobile brake shoe having a brake lining material applied thereon by the method constituting the present invention and illustrating the rivet structure embodied in the present invention.

Figure 2 is a view in perspective illustrating the fragmentary portion of the brake lining material prepared to receive the rivet.

Figure 3 is a transverse sectional view of the brake lining illustrated in Figure 2, the section being taken on a plane indicated by the line 3—3 in Figure 2.

Figure 4 is an elevational view of a section of brake lining illustrating the rivet mounted in the first step of the assembly.

Figure 5 is a sectional view of the rivet and brake lining illustrated in Figure 4, the section being taken on the plane indicated by the line 5—5 in Figure 4.

Figure 6 is a detailed view in section showing in an enlarged scale the brake shoe, the brake lining and a rivet as positioned incident the assembly operation.

Figure 7 is a detailed view in section similar to Figure 6 illustrating the relation of the parts after compressive effort has been applied to the rivet and the parts are drawn into their interengaged relation.

Figure 8 is a detailed view in perspective illustrating the rivet, the illustration being shown on an enlarged scale.

Referring to the drawing and particularly to Figure 1 thereof, the brake shoe 10 comprises the usual arcuate segment having a flanged braking area 11 which is provided with a plurality of apertures 12 to receive the rivets 13. The brake lining 14, which in the present embodiment is formed of a material commercially known as molded brake lining, is formed with shallow recesses or counter-bored seats 15, the diameter thereof being proportioned with respect to the head of the rivet to receive and retain the same in its unstressed form. The rivet 13 is formed of a ductile material and comprises a head 17 having a conical recess in the face thereof which extends inwardly to the substantial depth of the head so that the remaining body of the head constitutes a relatively thin frusto-conical wall. The shank portion of the rivet is slightly tapered adjacent its end to facilitate the ready entrance thereof within the apertures 12. The body of the shank portion of the rivet is diametrically proportioned in relation to the aperture 12 to provide a press or drive fit when the rivet is inserted in the aperture.

In practice the brake lining is first counter-bored to a suitable depth, and as shown in Figure 4, the head 17 of the rivets are then inserted in these seats where they will be snugly engaged in self sustaining relation with the brake lining. The strip of brake lining is then applied to the brake shoe, the ends of the rivets being introduced in the apertures 12 in the brake shoe. The shank of the rivets are then forced to their seated position in the brake shoe flange, the head of the rivet being distortively expanded either simultaneously or upon the completion of pressure application. The material and form of the head of the rivet will facilitate the expansion of the periphery of the rivet head with the circumjacent walls of the counter-bore 15 so that the perimeter of the head will cut or displace the adjacent material and thus effect the interlocked engagement of the rivet within the brake lining material.

From the foregoing it will be seen that brake lining material prepared and applied in conformity with the present invention may be readily affixed upon a brake shoe without removing the same from the brake assembly of the automobile and that the application thereof may be readily executed with hand tools or other suitable instrumentality which may be conveniently and expeditiously handled to effect such application.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. The method of applying brake lining upon a brake shoe which comprises forming recesses in the brake lining material at points coincident with apertures in the brake shoe, assembling the headed portions of rivets therein the heads of said rivets being circumferentially deformable under the application of compressive effort, inserting the end portions of the shanks of the rivets into the respective apertures in the brake shoe, the major portion of the body of the shank of said rivet being proportioned relative to the apertures to effect a driving fit therein and applying compressive effort upon the outer surface of the brake lining to force the shank of the rivets within the apertures and to flatten the heads of the rivets within the brake lining material.

2. The method of securing brake lining upon a brake shoe which comprises, mounting headed rivets within recesses extending partially through the brake lining, the heads of the rivets being diametrically deformable, inserting the shank of said rivets into apertures in the brake shoe, the shanks of said rivets being formed for driving engagement within the said apertures and affixing the brake lining upon the brake shoe by applying adequate compressive effort upon the outer surface of the brake lining to force the shank of the rivets through the apertures and to expansively deform the marginal edges of the rivet heads beyond the confines of the recesses within which they are mounted.

3. The method of uniting two articles one of which is formed of a relatively soft material, which comprises, assembling a diametrically deformable rivet head within a recess in the softer material, assembling the end of the shank of said rivet within an aperture in the second article, the shank of said rivet being formed for frictional engagement therein, and applying pressure upon the outer surface of the softer material to effect the entry of the rivet shank within said aperture and the deformation of the marginal edge of the rivet head beyond the confines of the recess within which it is assembled.

4. In combination, a brake shoe having apertures therein, brake lining having recesses therein and a rivet comprising a shank portion frictionally retained within the aperture in the brake shoe and head embodying a relatively thin flange engaged within the recess in the brake lining by the distortion of the brake lining material circumjacent the marginal edge of said flange.

5. In combination, a brake shoe having apertures therein, brake lining having recesses therein, and a rivet embodying a shank portion frictionally retained within one of said apertures and a head embedded within the brake lining by the material surrounding said recesses, the securement of the rivet head within the brake lining being effected through the circumferential deformation of the rivet head when the shank of the rivet is driven into the said aperture in the brake lining.

6. In combination, a brake shoe having apertures therein, brake lining having recesses in one face thereof and a rivet embodying a shank portion frictionally engaged within said apertures and a deformable head retained within the brake lining by the material surrounding the recesses, the material forming the walls of the recess being compressed circumjacent the marginal edge of the rivet head and distorted thereover when the rivet head is deformed under application of pressure upon the outer face of the brake lining.

7. In combination, a brake shoe having apertures therein, brake lining having recesses in one face thereof, and a rivet embodying a shank portion frictionally engaged within said apertures and a circumferentially deformable head engaged by the walls defining said recess, the engagement of the brake lining material with said rivet head being effected by the circumferential expansion of the rivet head when the shank of the rivet is forced into the aperture in the brake shoe.

8. In combination, a relatively hard material having an aperture therein, a yieldable material having a recess therein, and a self securing rivet comprising a shank frictionally engaged within said aperture and a head of substantially disc form engaged by the walls of said recess by the circumferential distortive enlargement of said rivet head when the shank of said rivet is forced into said aperture.

GRANT W. FISSELL.